United States Patent
Bryant-Rich et al.

(10) Patent No.: US 8,812,769 B2
(45) Date of Patent: Aug. 19, 2014

(54) DATA STORAGE DEVICES

(75) Inventors: Donald Ray Bryant-Rich, Haifa (IL); Amir Aharonovich, Givatayim (IL)

(73) Assignee: Sandisk IL Ltd., Kfar Saba (IL)

( * ) Notice: Subject to any disclaimer, the term of this patent is extended or adjusted under 35 U.S.C. 154(b) by 979 days.

(21) Appl. No.: 12/261,495

(22) Filed: Oct. 30, 2008

(65) Prior Publication Data

US 2010/0115177 A1    May 6, 2010

(51) Int. Cl.
*G06F 12/00* (2006.01)
(52) U.S. Cl.
USPC ............................. 711/103; 710/13
(58) Field of Classification Search
USPC ............................. 711/103; 710/13
See application file for complete search history.

(56) References Cited

U.S. PATENT DOCUMENTS

| | | | |
|---|---|---|---|
| 7,136,951 B2 | 11/2006 | Deng et al. | |
| 7,296,144 B2 | 11/2007 | Bryant-Rich et al. | |
| 8,250,247 B2 | 8/2012 | Mardiks et al. | |
| 8,275,969 B2 | 9/2012 | Moran et al. | |
| 8,307,131 B2 | 11/2012 | Prevost et al. | |
| 8,473,941 B2 | 6/2013 | Tsvi et al. | |
| 8,533,741 B2 | 9/2013 | Jogand-Coulomb et al. | |
| 8,583,878 B2 | 11/2013 | Nochimowski et al. | |
| 2005/0251609 A1 | 11/2005 | Chou | |
| 2005/0289260 A1 | 12/2005 | Hamer et al. | |
| 2006/0161725 A1* | 7/2006 | Lee et al. | 711/103 |
| 2007/0143117 A1 | 6/2007 | Conley | |
| 2007/0233910 A1 | 10/2007 | Paley et al. | |
| 2008/0005409 A1 | 1/2008 | Kolokowsky et al. | |
| 2008/0106513 A1* | 5/2008 | Morotomi et al. | 345/156 |
| 2009/0138622 A1 | 5/2009 | Matzuzzi | |

FOREIGN PATENT DOCUMENTS

| | | |
|---|---|---|
| CN | 1529227 A | 9/2004 |
| CN | 101120330 A | 2/2008 |
| WO | 2006077318 A1 | 7/2006 |

OTHER PUBLICATIONS

U3 [online] [url=http://en.wikipedia.org/w/index.php?title=U3 &oldid=167126617], Oct. 26, 2007, [retrieved from internet Nov. 4, 2011].*
techniixupdate.com, How to safely remove your usb drive when Safely Remove Hardware icon disappear from taskbar in Win Xp. [online] [url=http://www.technixupdate.com/how-to-safely-remove-your-usb-drive-when-safely-remove-hardware-icon-disappear-from-taskbar-in-win-xp/], Oct. 20, 2007,[ retrieved from internet Nov. 4, 2011].*

(Continued)

*Primary Examiner* — Jared Rutz
(74) *Attorney, Agent, or Firm* — Toler Law Group, PC

(57) ABSTRACT

A data storage device includes a non-volatile memory array, a user input device, and a host interface adapted to connect the data storage device to a host device and convey data to the host device. In response to a first operation of the user input device, application configuration data is communicated from the data storage device to the host device. The application configuration data is configured to trigger execution by the host device of a configuration application that includes a listing of a plurality of applications for display by the host device allowing a user to identify a selected application. In response to selection of an application, application designation data is generated and stored in the non-volatile memory array. In response to a second operation of the user input device, the application designation data is communicated to the host device to trigger automatic execution by the host device of the selected application.

32 Claims, 7 Drawing Sheets

(56) References Cited

OTHER PUBLICATIONS

Device Class Definition for Human Interface Devices (HID), Jun. 27, 2001, USB Implementers' Forum, Version 1.11, [online] [url=http://www.usb.org/developers/devclass_docs/HID1_11.pdf] [retrieved from internet Nov. 4, 2011.*

International Search Report and Written Opinion received in corresponding PCT Application No. PCT/US2009/053138 from the International Searching Authority (EPO) dated Dec. 18, 2009.

Anonymous, "Autorun" (Oct. 29, 2008) retrieved from the Internet: URL: http://en.wikipedia.org/w/index.php?title=AutoRun&oldid=248476964#Sample_USBready_autorun.inf_file>, retrieved on Dec. 7, 2009, pp. 1-6.

Anonymous, "U3" (Oct. 28, 2008) retrieved from the Internet: URL: http://wikipedia.org/w/index.php?title=U3&oldid=248300503>, retrieved on Dec. 7, 2009, pp. 1-6.

First Office Action issued Apr. 1, 2013 in Chinese Application No. 200980138801.1, with English translation, 20 pages.

Anonymous "U3", Wikipedia, http://wikipedia.org/w/index.php?title=U3&oldid=167126617>, (Oct. 26, 2007), 4 pages.

International Preliminary Report on Patentability for International Application No. PCT/US2009/053138, issued May 3, 2011, 8 pages.

Second Office Action issued Oct. 29, 2013 in Chinese Application No. 200980138801.1, with English translation, 26 pages.

* cited by examiner

DATA STORAGE DEVICES

FIELD OF THE DISCLOSURE

The present disclosure is generally related to data storage devices.

BACKGROUND

Starting applications from an external data storage device is limited to autorun on insertion of the data storage device or requires knowledge of how to find and run applications on a host device. Applications can be started upon insertion of the data storage device if the operating system of the host device supports autorun and the autorun capability has not been disabled. Alternatively, a service may be installed to start one or more applications upon insertion of the data storage device. Use of either mechanism requires removal and re-insertion of the data storage device if the application is to be restarted. Applications can be started by a knowledgeable user of the host device in many ways, but the user must know the location of the application and how to invoke the application using the operating system of the host device. This may be difficult for inexperienced users who are familiar with only a limited set of functions on the host device.

SUMMARY

In a device embodiment, a data storage device includes a non-volatile memory array, a user input device, and a host interface adapted to connect the data storage device to a host device and convey data to the host device. In response to a first operation of the user input device, application configuration data is communicated from the data storage device to the host device. The application configuration data is configured to trigger execution by the host device of a configuration application. The configuration application includes a listing of a plurality of applications for display by the host device allowing a user to identify one of the plurality of applications as a selected application. In response to selection of an application, application designation data is generated and stored at the non-volatile memory array. In response to a second operation of the user input device, the application designation data is communicated from the data storage device to the host device. The application designation data is configured to trigger automatic execution by the host device of the selected application.

In another device embodiment, a data storage device may include a host interface adapted to connect the data storage device to a host device. The data storage device also includes a non-volatile memory array and a first user input device. The non-volatile memory array is dedicated for storage of content having a specific content type and contains application identification data corresponding to a predefined application. The predefined application is associated with the specific content type. The application identification data is communicated from the data storage device to the host device via the host interface in response to an operation of the first user input device to trigger execution by the host device of the predefined application.

In a method embodiment, a method for data storage management may include detecting a first operation of a user input device of a data storage device. This method further includes communicating data to a host device via a host interface of the data storage device. The data is configured to trigger execution by the host device of a configuration application. The method also includes detecting a second operation of the user input device identifying one of a plurality of applications as a selected application. The method also includes storing application designation data corresponding to the selected application at a non-volatile memory array of the data storage device. The method also includes detecting a third operation of the user input device at the data storage device and communicating the application designation data from the data storage device to the host device. The application designation data is configured to trigger execution by the host device of the selected application.

DETAILED DESCRIPTION

Figure 1:
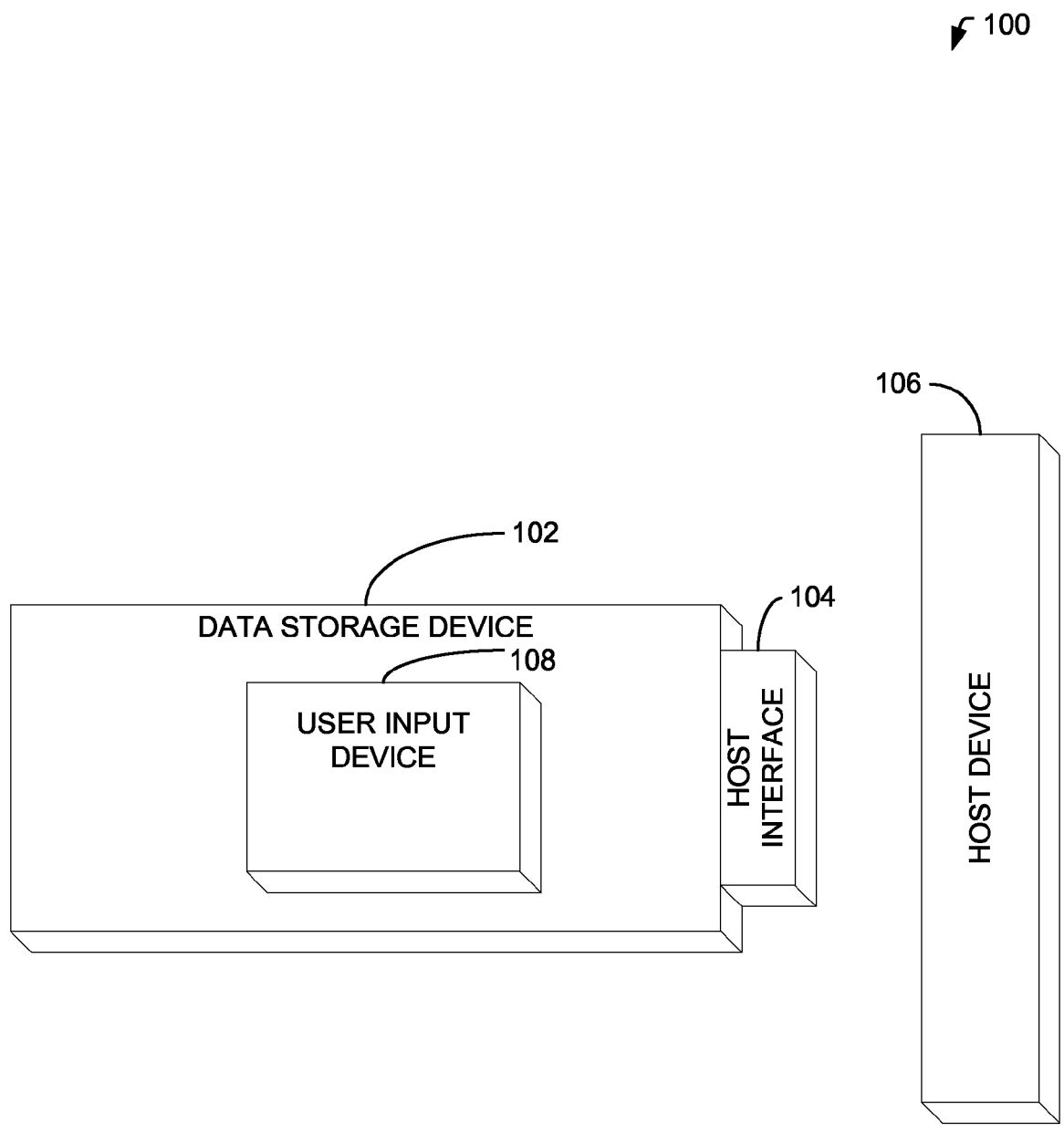
FIG. 1 is a diagram of a first illustrative embodiment of a data storage device.

The present disclosure incorporates a button or other user input device into a data storage device that may hold either an application or data used by the application. For example, the data storage device may be a Universal Serial Bus (USB) flash device (UFD) that is external and removably connectable to a host device. As another example, the user input device may include a wireless input device allowing for remote user operation of the user input device. The button or other user input device provides notification to the host device when the user input device is operated. As an example, user operation of the user input device may include a user depressing the button. Software running on the host device then invokes the application associated with the data storage device. For example, the application associated with the data storage device may include a configuration application allowing the user to select an application to associate with the data storage device. As another example, the application associated with the data storage device may be a predefined application. More than one application may be invoked directly or indirectly.

In a particular embodiment, the data storage device is a composite UFD that implements both a mass storage class and a human interface device (HID) class. The HID device class may be used to interface a button or other user input device on the UFD to the host device as if the UFD were a keyboard or a mouse with one or more buttons. When used in conjunction with a host device with software set to respond to the inputs of the HID device, the user may invoke functionality associated with the UFD (either by an application on the UFD or by the type of data stored on the UFD) at any time by operating the button or other user input device to provide user input. The application or functionality may be invoked on the host device without knowledge of an operating system of the host device. The HID device class is provided for illustration purposes only. In alternative embodiments, other data may be communicated from the data storage device to the host device in response to an operation of the button or other user input devices. For example, in the case of a button, operation of the button may include a user selecting the button, depressing the button, or otherwise manipulating the button. As another example, in the case of a rotating dial, operation may include the user moving the rotating dial between multiple dial positions. As a further example, in the case of a switch, operation may include the user toggling the switch between switch positions. In the case of a wireless user input device, operation may include the user remotely transmitting a wireless signal to the user input device. Thus, several alternatives exist for user operation of the user input device, including physical manipulation and remote operation via wireless signals.

Multiple buttons or other user input devices may be used to allow the user to invoke several applications. This functionality is similar to keyboard buttons used to open My Documents, My Pictures, email, or a web browser, among other alternatives. On the UFD, the buttons might, for example, open a picture slide show, start a video player, open a PowerPoint™ client, or open an email client, among other alternatives. For example, the buttons may eject the UFD safely from the host device while removing user data from the host device to protect user privacy, launch a user environment profile on the host device, allow for parental control by providing a hardware tool for parents to limit use of the host device by children, or switch between private and public security partitions. A single button together with a multiple position input such as a rotating dial may be used by moving the multiple position input to reflect an intended use of the UFD to store video, music, pictures, documents, or applications, among other alternatives. The associated software invokes the application associated with the primary intended use. For example, a button on the UFD set to video may start a video player application, while a button on the UFD set to pictures may start a slide-show application or a photo editor application.

The software used at the host device to react to user operation of a button or other user input device may be installed from the UFD using any appropriate method, including, for example, the method described in the U3 technical specification. Once installed on the host device, the user may invoke applications at any time without using a host device interface. The software may be transiently installed from the UFD, may be resident on the host device, or may be loaded from another source such as a network server.

The application invoked by the button or other user input device may be fixed at manufacturing time, fixed at manufacturing time but disabled by the user or initially configured or fixed at manufacturing time and further customizable by the user. For example, the button may be fixed at manufacturing time to launch a predefined application (e.g., a backup application) without user configuration of the button. Further, the backup application may automatically execute a backup of data from the host device to the data storage device. For example, a personal computer (PC) may be backed up to the data storage device automatically in response to user selection of the button or other user input device. Alternatively, any other application may automatically execute one or more actions in response to user selection of the button or other user input device.

Referring to FIG. 1, an illustrative embodiment of a data storage device 102 is shown, at 100. The data storage device 102 includes a host interface 104 between the data storage device 102 and a host device 106. A host interface implemented as a Universal Serial Bus (USB) interface is configured according to an existing USB standard. The data storage device 102 also includes a user input device 108. The user input device 108 may include a button or other user input device. The data storage device 102 also includes a non-volatile memory array (e.g., non-volatile memory array 610 in FIG. 6). In a particular embodiment, the data storage device 102 also includes a memory controller (e.g., memory controller 608 in FIG. 6) coupled to the host interface 104 and to the non-volatile memory array.

Upon connection of the data storage device 102 to the host device 106, data may be communicated from the data storage device 102 to the host device 106 via the host interface 104. In response to a first operation of the user input device 108, data is communicated from the data storage device 102 to the host device 106 via the host interface 104. In a particular embodiment, the data is configured to trigger execution by the host device 106 of a configuration application. In an alternative embodiment, the data is configured to trigger execution by the host device 106 of a predefined application. In a particular embodiment, the data communicated from the data storage device 102 to the host device 106 includes a first human interface device (HID) descriptor that provides instructions to the host device 106 to launch the configuration application. In one embodiment, the first HID descriptor includes an array of bytes describing data packets communicated from the data storage device 102 to the host device 106. Alternatively, other data associated with or otherwise identifying the application may be communicated from the data storage device 102 to the host device 106 via the host interface 104 in response to the first operation of the user input device 108. For example, data may be communicated that locks the data storage device 102, and the host device 106 may prompt a user for a password to unlock the data storage device 102.

The configuration application includes a listing of a plurality of applications for display by the host device 106 allowing a user to identify one of the plurality of applications as a selected application. For example, the listing of the plurality of applications may be displayed to the user via a display device connected to the host device 106 (e.g., a computer monitor or an LCD display). The user may select one of the applications via a keyboard or mouse connected to the host device 106. Alternatively, the user may select one of the applications using the user input device 108. The user input device 108, such as a button, may allow the user to scroll through the listing of the plurality of applications in an up-and-down or a left-to-right manner.

In response to user selection of one of the applications, application designation data identifying the selected application is generated and stored at the non-volatile memory array of the data storage device 102. Storing the application designation data at the non-volatile memory array of the data storage device 102 allows the data to be communicated from the data storage device 102 to the host device 106 or another host device in response to subsequent operation of the user input device 108. The application designation data is configured to trigger automatic execution of the selected application by the host device 106 or another host device. The user does not need to have knowledge of the operating systems of the host devices.

In response to a second operation of the first user input device 108 of the data storage device 102, the application designation data is communicated from the data storage device 102 to the host device 106 via the host interface 104, and the selected application is automatically launched by the host device 106. The application designation data may be communicated from the data storage device 102 to the host device 106 via the host interface 104 in response to the second operation of the user input device 108. In a particular embodiment, the application designation data includes a second HID descriptor that provides instructions to the host device 106 to launch the selected application. The second HID descriptor may include an array of bytes describing data packets communicated from the data storage device 102 to the host device 106. Alternatively, other data associated with or otherwise identifying the selected application may be communicated from the data storage device 102 to the host device 106 via the host interface 104 in response to the second operation of the user input device 108.

In a particular embodiment, the data storage device 102 is detachable from the host device 106. For example, the host device 106 may include a personal computer, a laptop computer, a server computer or any other electronic device. As mentioned above, in one embodiment, the host interface 104 is a USB interface, allowing the data storage device 102 to be connected to a first host device (e.g., host device 106), detached from the first host device, and reconnected to a second host device (not shown). Alternative host interface 104 configurations are possible, including any one of an IEEE 1394 interface (e.g., a Firewire interface), a Small Computer System Interface (SCSI) interface, a High-Definition Multimedia Interface (HDMI) interface, a wireless interface, or an Ethernet interface, among other alternatives. Upon connection of the data storage device 102 to the second host device, data may be communicated from the data storage device 102 to the second host device via the host interface 104. In a particular embodiment, in response to a second operation of the user input device 108 of the data storage device 102, the application designation data is communicated from the data storage device 102 to the second host device via the host interface 104, and the selected application is automatically launched by the second host device. Thus, once the user has selected an application from the plurality of applications, subsequent operation of the user input device 108 is configured to trigger execution of the selected application by one or more host devices without additional user operation of the user input device 108. In an alternative embodiment, the data storage device 102 may be configured to communicate with a single host device or a set of host devices. Thus, the functionality associated with the user input device 108 may only be available for a select number of host devices.

In a particular embodiment, the non-volatile memory array of the data storage device 102 includes a flash memory array, and the host interface 104 includes a USB interface. In a particular embodiment, the data storage device 102 is a USB flash device (UFD) that complies with the U3 technical specification (e.g., a U3 smart drive). With U3 smart drives, applications are allowed to write files or registry information to the host device 106, but the written information is removed when the U3 smart drive is ejected from the host device 106. However, the U3 technical specification is provided for illustration purposes only. In other embodiments, alternative solutions may provide the same functionality. Thus, the data storage device 102 may be adapted to remove any temporary files at the host device 106 and to clean traces of the data storage device 102. After the data storage device 102 is connected to the host device 106 via the host interface 104, the data storage device 102 may be disconnected from the host device 106 in response to a command at the host device 106 to disconnect the data storage device 102. Alternatively, the data storage device 102 may be physically removed from the host device 106.

In another particular embodiment, the non-volatile memory array of the data storage device 102 includes application identification data corresponding to a predefined application. In response to a first operation of the user input device 108 at the data storage device 102, the application identification data is communicated from the data storage device 102 to the host device 106 via the host interface 104. The application identification data is configured to trigger execution by the host device 106 of the predefined application. In a particular embodiment, the non-volatile memory array of the data storage device 102 includes a flash memory array. In a particular embodiment, the non-volatile memory array stores data files formatted for processing by the predefined application. In another particular embodiment, the non-volatile memory array may be dedicated for storage of content having a specific content type. The specific content type may include one of a text content type, an audio content type, or a video content type, among other alternatives. In a particular embodiment, the predefined application is associated with the specific content type. For example, if the specific content type is a text content type, in response to operation of the user input device 108, the application identification data triggers automatic execution by the host device 106 of a word processor application.

As a further example, the predefined application may be a backup application. The backup application may automatically execute a backup of data from the host device 106 to the data storage device 102. For example, a personal computer (PC) may be backed up to the data storage device 102 automatically in response to user selection of the user input device 108. Alternatively, the data storage device 108 may automatically back up data to the host device 106 in response to user selection of the user input device 108. Alternatively, any other application may automatically execute one or more actions in response to user selection of a button or other user input device 108. Thus, the user input device 108 may be configured to not only launch a particular application in response to a user selection but also to trigger the particular application to perform one or more actions in response to the user selection. The one or more actions may be defined by a user or may be predefined actions associated with the particular application.

Figure 2:
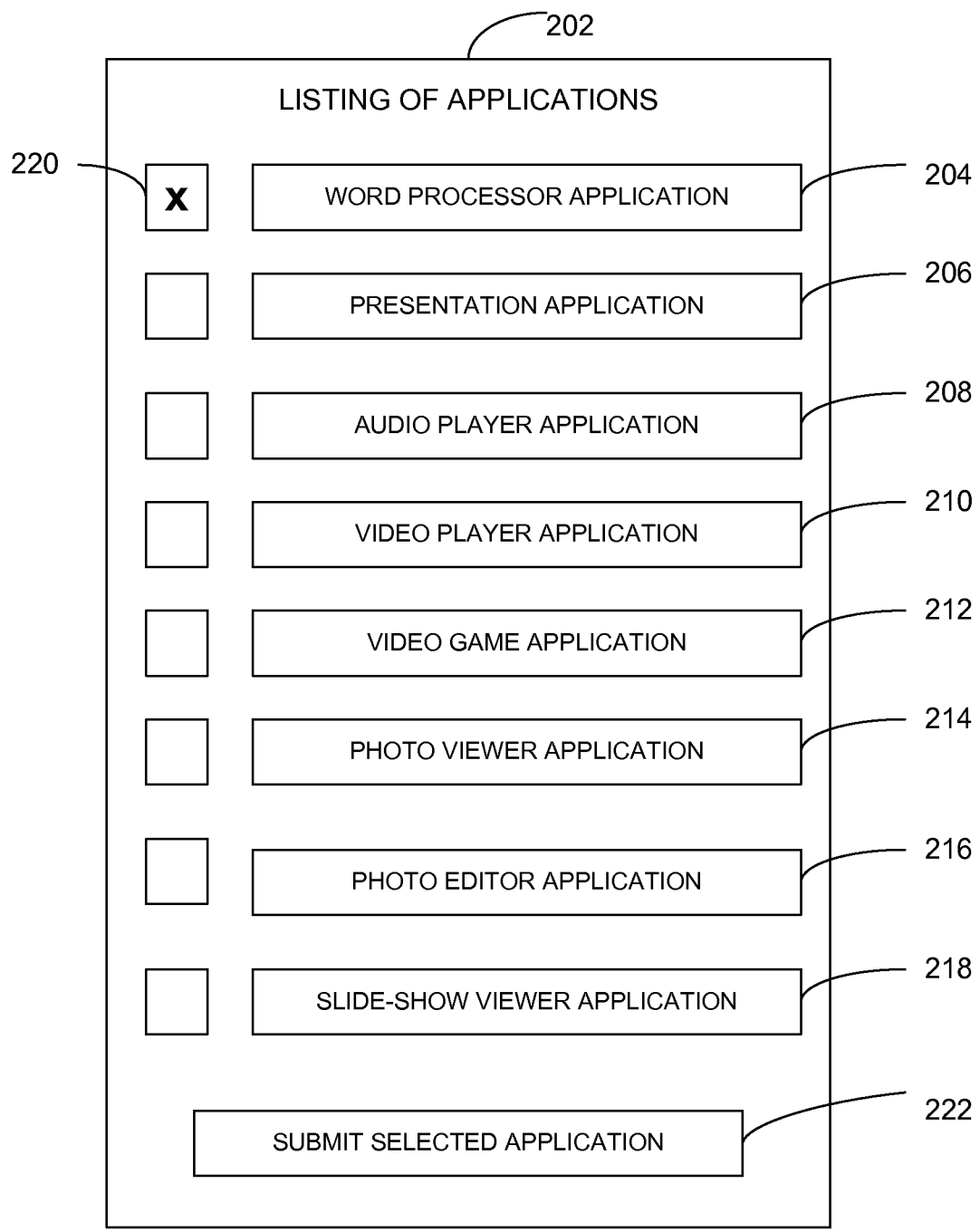
FIG. 2 is a view of an illustrative graphical user interface adapted to display a listing of a plurality of applications for user selection.

Referring to FIG. 2, a view of an illustrative embodiment of a graphical user interface (GUI) adapted to display a listing of a plurality of applications for user selection is shown, at 200. The GUI 200 includes a listing of applications 202 available for user selection. The listing of applications 202 includes, but is not necessarily limited to, a word processor application 204, a presentation application 206, an audio player application 208, a video player application 210, a video game application 212, a photo viewer application 214, a photo editor application 216, and a slide-show viewer application 218. Alternatively, the listing of applications 202 may include any number of executable software applications.

A user may select one of the applications from the listing of applications 202 using a check box 220 or other selection means. For example, the user may select one of the applications via a keyboard or mouse connected to a host device. Alternatively, the user may select one of the applications using a user input device of the data storage device (e.g., user input device 108 of data storage device 102 in FIG. 1). For example, the user input device, such as a button, may allow the user to scroll through the listing of applications 202 in an up-and-down or a left-to-right manner.

The user may then submit the selected application using a submit button 222 or other submission means. Alternatively, the user may submit the selection of the application using a user input device of the data storage device (e.g., user input device 108 of data storage device 102 in FIG. 1). For example, the user input device, such as a button, may allow the user to select one of the applications from the plurality of applications 202 by selecting the button. In the embodiment shown in FIG. 2, the word processor application 204 has been selected as the selected application, as indicated by the selection of the check box 220. In response to identification of one of the plurality of applications (e.g., the word processor application 204) from the listing of applications 202, application designation data is generated and stored at a non-volatile memory array of a data storage device (e.g., the data storage device 102 in FIG. 1).

Figure 3:
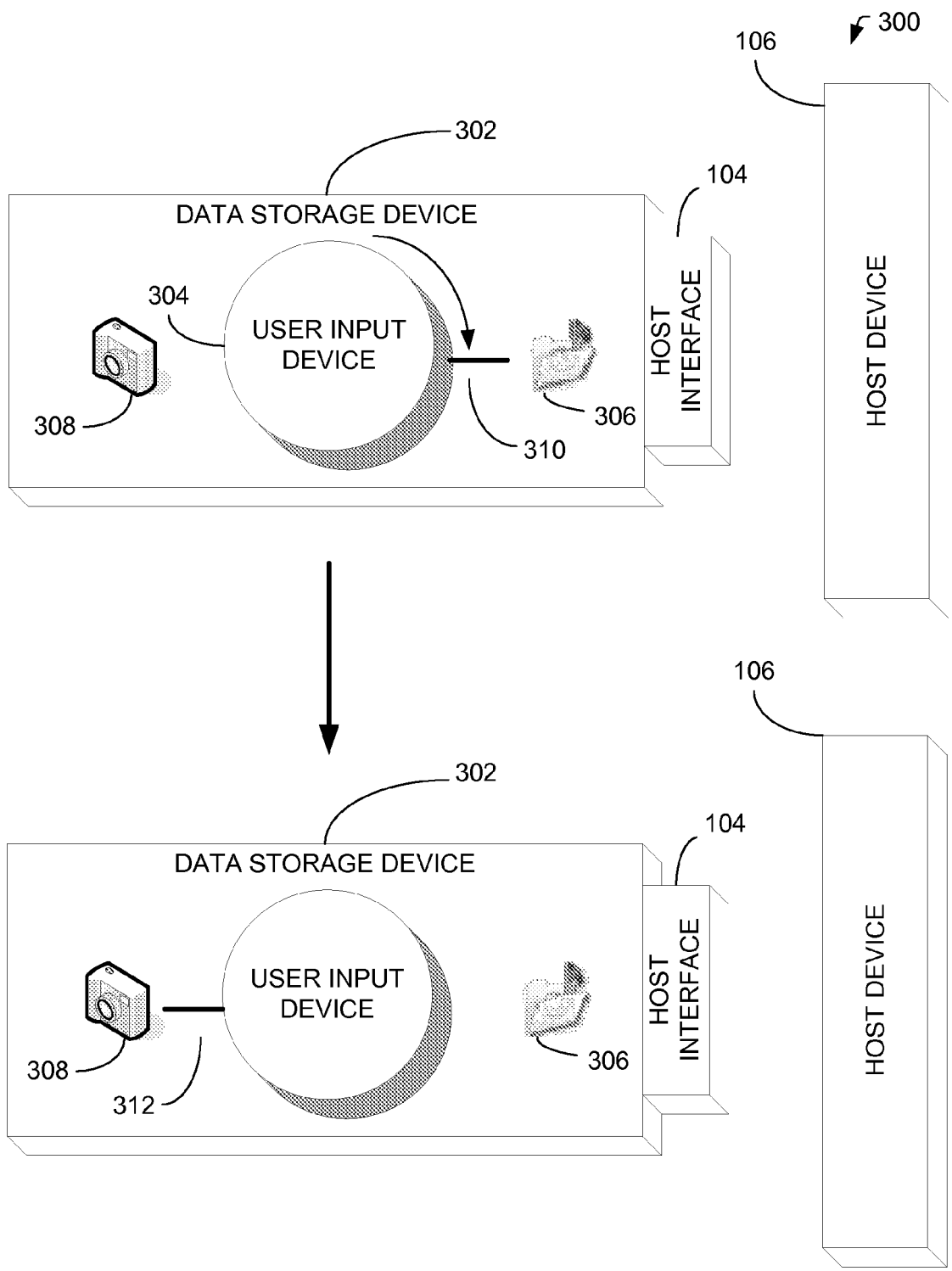
FIG. 3 is a diagram of a second illustrative embodiment of a data storage device.

Referring to FIG. 3, a block diagram of a particular embodiment of a data storage device 302 is illustrated, at 300. The data storage device 302 includes a host interface 104 adapted to connect the data storage device 302 to the host device 106. The data storage device 302 further includes a user input device 304 that is movable between a plurality of user selectable positions. Each of the plurality of user selectable positions is associated with one of a plurality of executable software applications. In a particular embodiment, each of the plurality of user selectable positions is associated with one of a plurality of predefined applications. Alternatively, each of the plurality of user selectable positions may be associated with a configuration application, as described above. As illustrated in FIG. 3, the user input device 304 is movable between a first user selectable position 310 and a second user selectable position 312. The first user selectable position 310 is associated with a first application, and the second user selectable position 312 is associated with a second application.

In response to an operation of the user input device 304 at the first user selectable position 310, data is communicated from the data storage device 302 to the host device 106 via the host interface 104. The data communicated from the data storage device 302 to the host device 106 includes data associated with or otherwise identifying the first application. The data associated with or otherwise identifying the first application is configured to trigger execution by the host device 106 of the first application. In a particular embodiment, the first application is a first predefined application. Alternatively, the first application may be a configuration application, as described above. In response to the operation of the user input device 304 at the second user selectable position 312, data is communicated from the data storage device 302 to the host device 106 via the host interface 104. The data communicated from the data storage device 302 to the host device 106 includes data associated with or otherwise identifying the second application. The data associated with or otherwise identifying the second application is configured to trigger execution by the host device 106 of the second application. In a particular embodiment, the second application is a second predefined application. Alternatively, the second application may be a configuration application, as described above.

In a particular embodiment, the data communicated from the data storage device 302 to the host device 106 in response to an operation of the user input device 304 at the first user selectable position 310 includes a first HID descriptor associated with the first application. In another particular embodiment, the data communicated from the data storage device 302 to the host device 106 in response to an operation of the user input device 304 at the second user selectable position 312 includes a second HID descriptor associated with the second application. Alternatively, other data associated with or otherwise identifying the first application or second application may be communicated from the data storage device 302 to the host device 106 via the host interface 104 in response to the operation of the user input device 304 at the first user selectable position 310 or at the second user selectable position 312.

In the embodiment shown in FIG. 3, the data storage device 302 includes a plurality of application indicators. Each of the plurality of application indicators describes the application associated with the user selectable position. Each of the plurality of application indicators may include a text description or a visual description of the application associated with the user selectable position. A first application indicator 306 is proximate to the first user selectable position 310. The first application indicator 306 describes a first application associated with the first user selectable position 310. A second application indicator 308 is proximate to the second user selectable position 312. The second application indicator 308 describes a second application associated with the second user selectable position 312. In a particular embodiment, the first application is a first predefined application, and the second application is a second predefined application. In the embodiment shown in FIG. 3, the first application indicator 306 proximate to the first user selectable position 310 includes a visual image of the first predefined application. In the embodiment shown, the visual image includes a visual image of an audio player application. Similarly, the second application indicator 308 proximate to the second user selectable position 312 includes a visual image of the second predefined application. In the embodiment shown in FIG. 3, the visual image of the second predefined application includes a visual image of a photo viewer application.

In alternative embodiments, the plurality of application indicators may include application indicators associated with one or more of a word processor application, a presentation application, an audio player application, a video player application, a video game application, a photo viewer application, a photo editor application, or a slide-show viewer application, or any other executable software application. Alternatively, or in addition, each of the application indicators may include a text description of the application associated with the user selectable position. For example, instead of the visual image associated with an audio player application, the first application indicator 306 may include a text description of the audio player application. Similarly, instead of the visual image associated with a photo viewer application, the second application indicator 308 may include a text description of the photo viewer application.

In the embodiment shown in FIG. 3, the data storage device 302 includes a user input device 304 that is movable between two user selectable positions. It should be understood that in alternative embodiments more than two user selectable positions may be included on the data storage device 302. Further, in the embodiment shown of the data storage device 302, the user input device 304 includes a rotatable button that is movable between the first user selectable position 310 and the second user selectable position 312. In alternative embodiments, the user input device 304 may include a button, a rotating dial, a toggle switch, or any other user input device that is movable between a plurality of user selectable positions.

Figure 4:
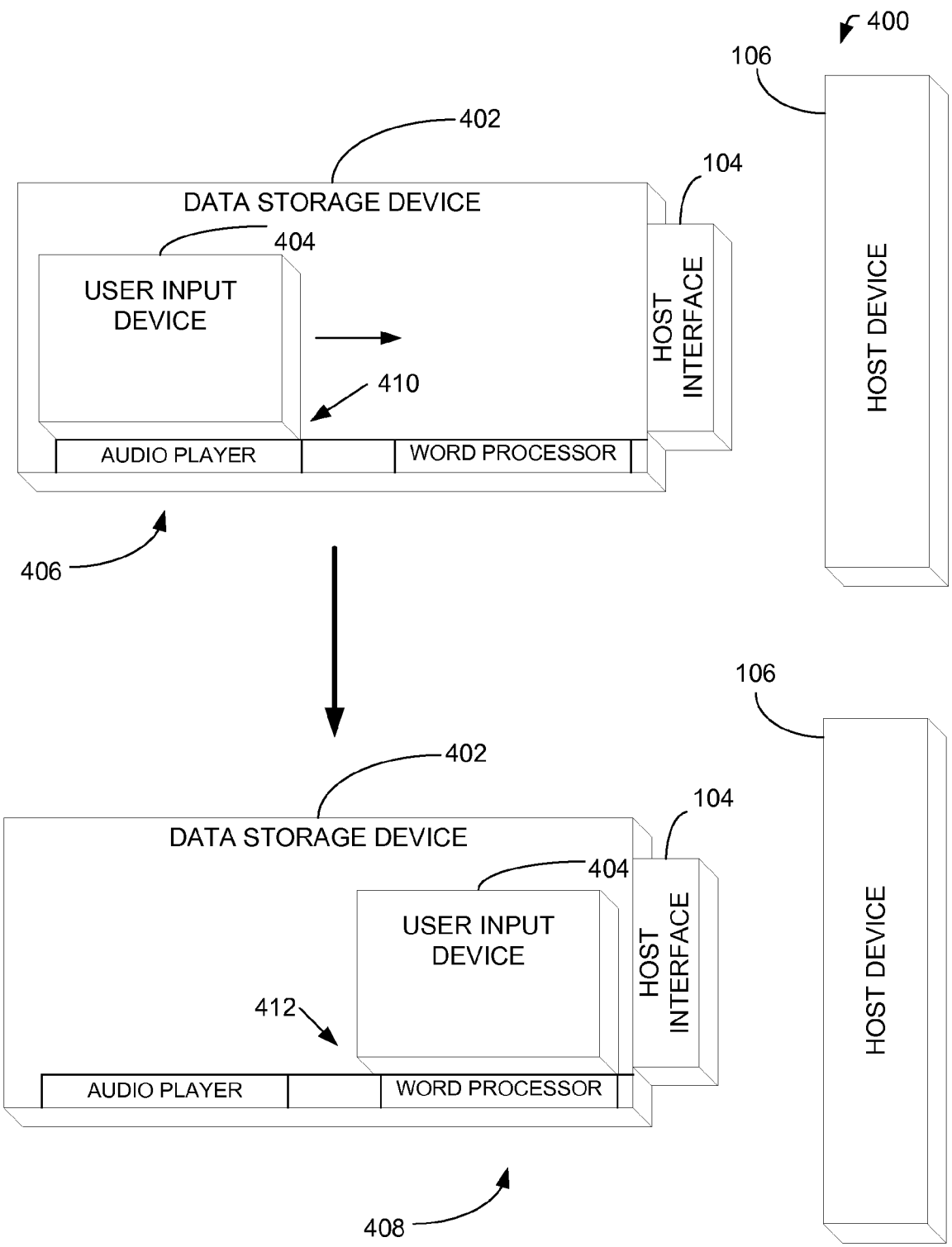
FIG. 4 is a diagram of a third illustrative embodiment of a data storage device.

Referring to FIG. 4, a block diagram of a particular embodiment of a data storage device 402 is illustrated, at 400. The data storage device 402 includes a host interface 104 adapted to connect the data storage device 402 to the host device 106. The data storage device 402 further includes a user input device 404 that is movable between a plurality of user selectable positions. In the embodiment shown in FIG. 4, each of the plurality of user selectable positions is associated with one of a plurality of predefined applications. As illustrated in FIG. 4, the user input device 404 is movable between a first user selectable position 410 and a second user selectable position 412. The first user selectable position 410 may be associated with a first predefined application, and the second user selectable position 412 may be associated with a second predefined application. Alternatively, the first user selectable position 410 and second user selectable position 412 may be associated with a configuration application, as described above.

In the embodiment shown in FIG. 4, the data storage device 402 includes a plurality of application indicators. Each of the plurality of application indicators describes the application associated with the user selectable position. In the embodiment shown in FIG. 4, each of the plurality of application indicators includes a text description of the predefined application. Alternatively, each of the plurality of application indicators may include a visual image or other description of the predefined application. A first application indicator 406 is proximate to the first user selectable position 410. A second application indicator 408 is proximate to the second user selectable position 412. In the embodiment shown in FIG. 4, the first application indicator 406 proximate to the first user selectable position 410 includes a text description of the first predefined application. In the embodiment shown in FIG. 4, the text description of the first predefined application includes a text description of an audio player application. Similarly, the second application indicator 408 proximate to the second user selectable position 412 includes a text description of the second predefined application. In the embodiment shown in FIG. 4, the text description of the second predefined application includes a text description of a word processor application. In alternative embodiments, the first application indicator 406 and the second application indicator 408 include text descriptions of a presentation application, a video player application, a video game application, a photo viewer application, a photo editor application, a slide-show viewer application, or any other executable software application.

In response to an operation of the user input device 404 at the first user selectable position 410, data is communicated from the data storage device 402 to the host device 106 via the host interface 104. The data communicated from the data storage device 402 to the host device 106 is associated with the first predefined application. In the embodiment shown in FIG. 4, the first predefined application includes an audio player application. Thus, in response to operation of the user input device 404 at the first user selectable position 410, the data communicated from the data storage device 402 to the host device 106 includes data associated with the audio player application. The data associated with the audio player application is configured to trigger execution by the host device 106 of the audio player application. In response to an operation of the user input device 404 at the second user selectable position 412, data associated with the second predefined application is communicated from the data storage device 402 to the host device 106 via the host interface 104. In the embodiment shown in FIG. 4, the second predefined application includes a word processor application. Thus, in response to operation of the user input device 404 at the second user selectable position 412, data associated with the word processor application is communicated from the data storage device 402 to the host device 106 via the host interface 104. The data associated with the word processor application is configured to trigger execution by the host device 106 of the word processor application.

Figure 5:
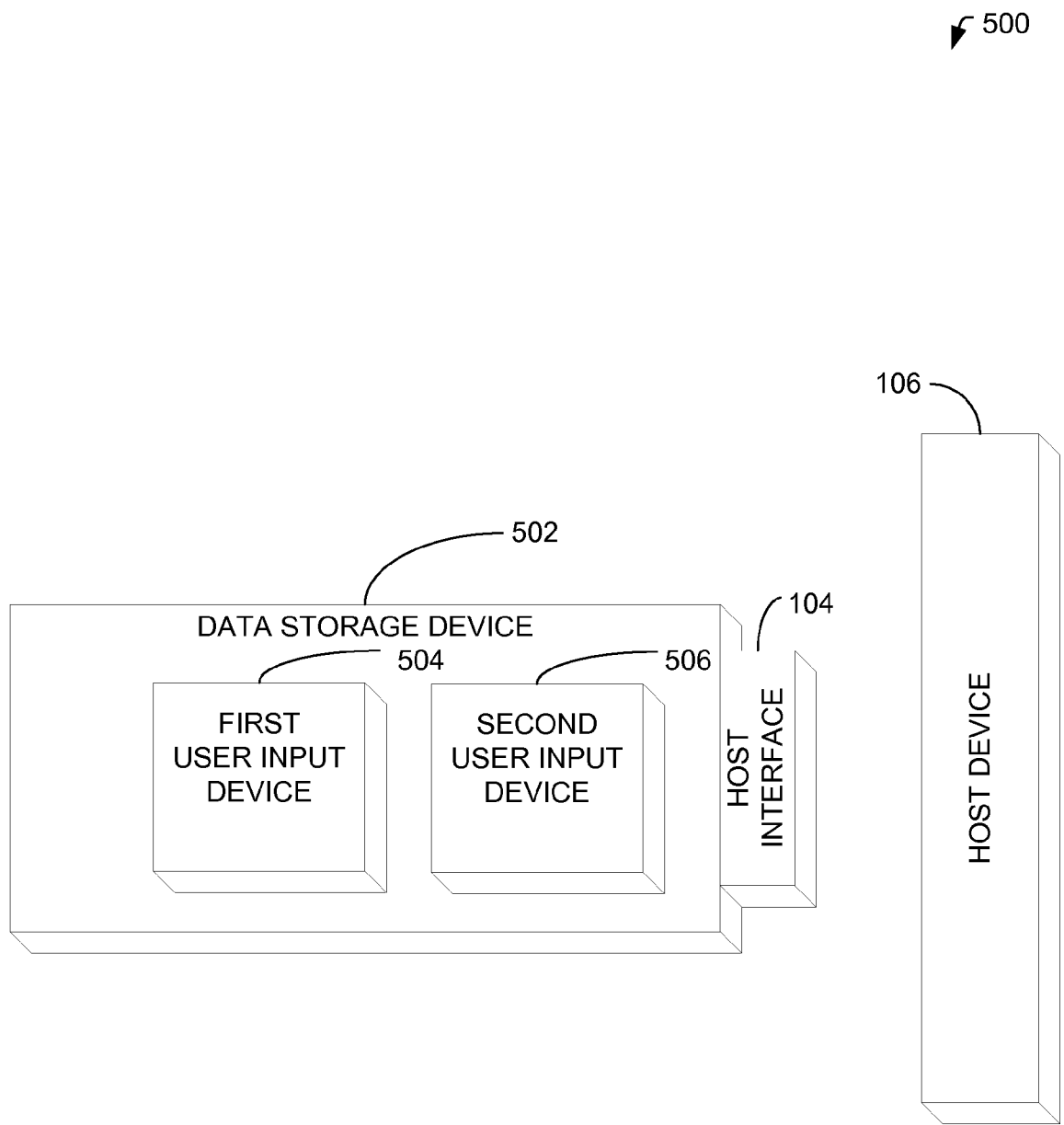
FIG. 5 is a diagram of a fourth illustrative embodiment of a data storage device.

Referring to FIG. 5, a block diagram of a particular embodiment of a data storage device 502 is illustrated, at 500. The data storage device 502 includes a host interface 104 adapted to connect the data storage device 502 to the host device 106. The data storage device 502 further includes a first user input device 504 and a second user input device 506. In response to an operation of the first user input device 504, data is communicated from the data storage device 502 to the host device 106 via the host interface 104. The data is configured to trigger execution by the host device 106 of a first application associated with the first user input device 504. In a particular embodiment, the first application is a first predefined application. In response to an operation of the second user input device 506, data is communicated from the data storage device 502 to the host device 106 via the host interface 104. The data is configured to trigger execution by the host device 106 of a second application associated with the second user input device 506. In a particular embodiment, the second application is a second predefined application.

In a particular embodiment, in response to an operation of the first user input device 504, the data communicated from the data storage device 502 to the host device 106 via the host interface 104 includes a first human interface device (HID) descriptor. The first HID descriptor is associated with the first application. In response to an operation of the second user input device 506, the data communicated from the data storage device 502 to the host device 106 via the host interface 104 includes a second HID descriptor. In a particular embodiment, the second HID descriptor is associated with the second application. The first HID descriptor and second HID descriptor may include an array of bytes describing data packets communicated from the data storage device 502 to the host device 106. Alternatively, other data associated with or otherwise identifying the first application or second application may be communicated from the data storage device 502 to the host device 106 via the host interface 104 in response to the operation of the first user input device 504 or the second user input device 506. The first user input device 504 may include a first button, and the second user input device 506 may include a second button. The data storage device 502 may be detachable from the host device 106. Further, the host interface 104 is adapted to connect the detachable data storage device 502 to one of a plurality of host devices. In one embodiment, the host interface 104 includes a USB interface.

In a particular embodiment, the first user input device 504 includes a first application indicator that describes the first application associated with the first user input device 504. In another particular embodiment, the second user input device 506 includes a second application indicator that describes the second application associated with the second user input device 506. For example, the first application indicator associated with the first user input device 504 may include a text description of the first application. Further, the second application indicator associated with the second user input device 506 may include a text description of the second application associated with the second user input device 506. Alternatively, the first application indicator associated with the first user input device 504 may include a visual image of the first application. Similarly, the second application indicator associated with the second user input device 506 may include a visual image associated with the second application. For example, the visual images may include images associated with a word processor application, a presentation application, an audio player application, a video player application, a video game application, a photo viewer application, a photo editor application, a slide-show viewer application, or any other executable software application. Thus, the first application indicator and the second application indicator may be used to describe or identify the application or an application type associated with each of the user input devices 504 and 506.

In a particular embodiment, the first application associated with the first user input device 504 includes one or more of a word processor application, a presentation application, an audio player application, a video player application, a video game application, a photo viewer application, a photo editor application, and a slide-show viewer application. Similarly, the second application associated with the second user input device 506 may include one or more of a word processor application, a presentation application, an audio player application, a video player application, a video game application, a photo viewer application, a photo editor application, and a slide-show viewer application. For example, if the first application associated with the first user input device 504 is a word processor application, in response to operation of the first user input device 504, data associated with the first application, the word processor application, is communicated from the data storage device 502 to the host device 106 via the host interface 104. The data associated with the word processor application is configured to trigger automatic execution by the host device 106 of the word processor application. Similarly, if the second application associated with the second user input device 506 is an audio player application, the data communicated from the data storage device 502 to the host device 106 via the host interface 104 includes data associated with the audio player application. In response to operation of the second user input device 506, data associated with the audio player application is communicated from the data storage device 502 to the host device 106 via the host interface 104. The data is configured to trigger automatic execution by the host device 106 of the audio player application.

Figure 6:
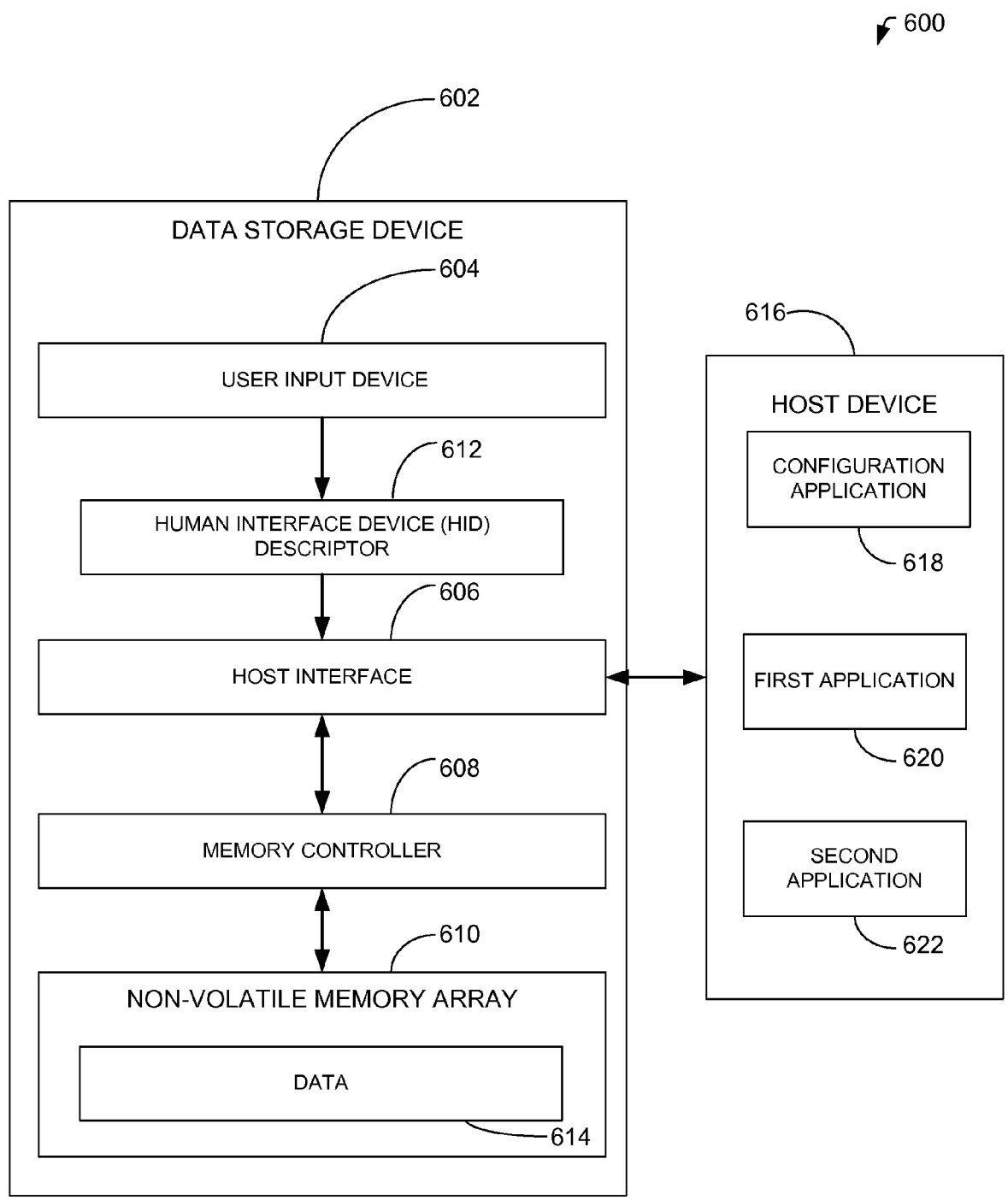
FIG. 6 is a block diagram of another illustrative embodiment of a data storage device.

Referring to FIG. 6, a block diagram of another particular embodiment of a data storage device 602 is illustrated, at 600. The data storage device 602 includes a host interface 606 adapted to connect the data storage device 602 to a host device 616. In the embodiment shown, the data storage device 602 includes a memory controller 608 coupled to the host interface 606. The data storage device 602 further includes a non-volatile memory array 610 coupled to the memory controller 608. The non-volatile memory array 610 is adapted to store data 614. Further, the data storage device 602 includes a user input device 604. In alternative embodiments, the data storage device 602 may include more than one user input device (as previously described). Further, the user input device 604 may be movable between a plurality of user selectable positions (as previously described).

In response to a first operation of the user input device 604, data is communicated from the data storage device 602 to the host device 616 via the host interface 606. The data may trigger a configuration application 618, a first application 620, or a second application 622, or any other executable software application to be executed by the host device 616. In a particular embodiment, the data is configured to trigger execution by the host device 616 of a configuration application 618. The configuration application 618 includes a listing of a plurality of applications for display by the host device 616 allowing a user to identify one of the plurality of applications as a selected application. For example, the host device 616 may display the listing of the plurality of applications in a graphical user interface (e.g., GUI 200 in FIG. 2). The selected application may be identified by the user using the graphical user interface. Application designation data identifying the selected application is generated and stored at the non-volatile memory array 610 of the data storage device 602. In a particular embodiment, in response to a second operation of the user input device 604, the application designation data is communicated from the non-volatile memory array 610 of the data storage device 602 via the host interface 606 to the host device 616. The application designation data triggers automatic execution by the host device 616 of the selected application. For example, the selected application may include a first application 620. Alternatively, the selected application may include a second application 622. The first application 620 and the second application 622 are displayed in the listing of the plurality of applications. Thus, the user identifies the first application 620, the second application 622, or another application from the listing of the plurality of applications displayed (e.g., displayed by the host device 616 at the graphical user interface).

In an alternative embodiment, the non-volatile memory array 610 contains application identification data corresponding to a predefined application. The application identification data is communicated from the data storage device 602 to the host device 616 via the host interface 606 in response to a first operation of the user input device 604. The application identification data is configured to trigger execution by the host device 616 of the predefined application. For example, the predefined application may include the first application 620 or the second application 622. Alternatively, the predefined application may include any other software applications executable by the host device 616. In a particular embodiment, the non-volatile memory array 610 stores data files formatted for processing by the predefined application. In another embodiment, the non-volatile memory array 610 is a flash memory array; thus, the non-volatile memory array 610 may be dedicated for storage of content having a specific content type. The specific content type may include one of a text content type, an audio content type, or a video content type, among other alternatives. The selected application may be associated with the specific content type.

In one embodiment, the data communicated from the data storage device 602 to the host device 616, via the host interface 606, includes a human interface device (HID) descriptor 612. For example, in response to an operation of the user input device 604, the data communicated from the data storage device 602 to the host device 616 may include a first HID descriptor that provides instructions to the host device 616 to launch one or more applications. For example, the first HID descriptor may include instructions to launch the configuration application 618, the first application 620, or the second application 622. In a particular embodiment, in response to a second operation of the user input device 604, the data communicated from the data storage device 602 to the host device 616 includes a second HID descriptor that provides instructions to the host device to launch a second application. For example, the second HID descriptor may include instructions to the host device 616 to launch the first application 620 or the second application 622. Alternatively, any other data associated with the configuration application 618, the first application 620, or the second application 622 may be communicated from the data storage device 602 to the host device 616 in response to operation of the user input device 604. In a particular embodiment, upon removal of the data storage device 602 from the host device 616, the second HID descriptor is communicated from the data storage device 602 to a second host device in response to subsequent operation of the user input device 604. Thus, the second HID descriptor may be used to communicate a user selected application to a second host device without user configuration of the data storage device 602.

Figure 7:
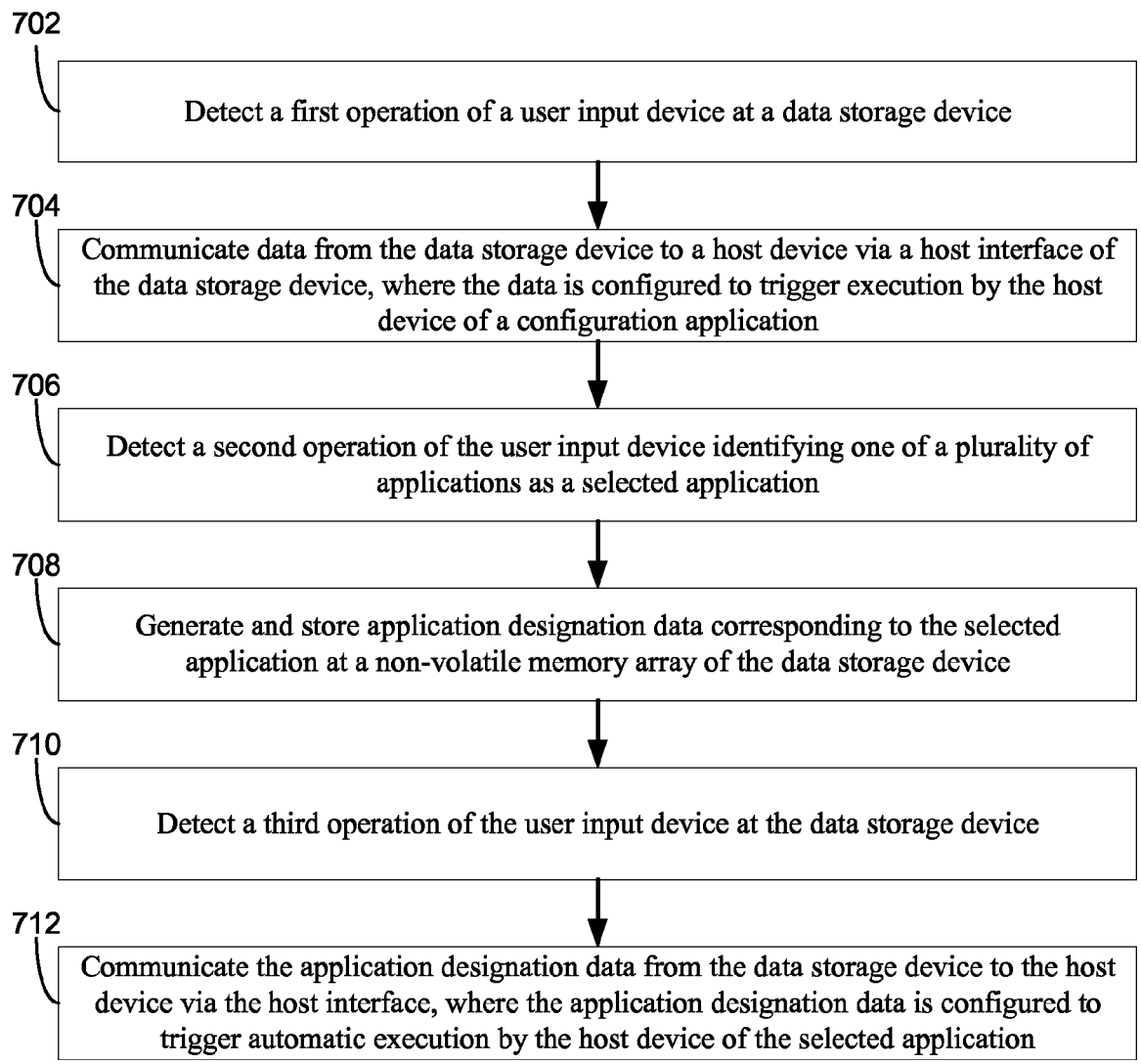
FIG. 7 is a flow diagram of an illustrative embodiment of a method of associating a selected application with a user input device of a data storage device.

Referring to FIG. 7, a flow chart of a particular embodiment of a method is illustrated, at 700. The method includes detecting a first operation of a user input device at a data storage device, at 702. The user input device may include a button, or any other user input means. In a particular embodiment, the data storage device includes one or more buttons and a host interface. Moving to 704, data is communicated from the data storage device to a host device via the host interface of the data storage device. In the embodiment shown in FIG. 7, the data is configured to trigger execution by the host device of a configuration application. In alternative embodiments, the data may trigger any other executable software application to be executed by the host device. Moving to 706, a second operation of the user input device is detected that identifies one of a plurality of applications as a selected application. At 708, application designation data corresponding to the selected application is generated and stored at a non-volatile memory array of the data storage device.

In a particular embodiment, the method further includes detecting a third operation of the user input device at the data storage device, at 710. Moving to 712, the application designation data is communicated from the data storage device to the host device via the host interface of the data storage device. The application designation data is configured to trigger execution by the host device of the selected application. Alternatively, the application designation data may trigger the selected application to be executed by a second host device. Thus, the method allows a user to configure the user input device to launch a selected application at one or more host devices.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data storage device, comprising:
a non-volatile memory array;
a user input device; and
a host interface adapted to connect the data storage device to a host device and convey data to the host device, including application designation data and application configuration data, the application configuration data being communicated to the host device in response to a first operation of the user input device and being configured to trigger execution by the host device of a configuration application, and the application designation data being generated and stored in the non-volatile memory array in response to selection of an application by a user, wherein the execution includes automatically locating and launching the selected application using an operating system of the host device, and wherein the application designation data is communicated to the host device in response to a second operation of the user input device, wherein communicating the application designation data is initiated after the data storage device is connected to the host device via the host interface;
wherein the configuration application includes a listing of a plurality of applications for display by the host device allowing a user to identify one of the plurality of applications as a selected application, and
wherein the application designation data is configured to trigger automatic execution by the host device of the selected application.

2. The data storage device of claim 1, wherein the user input device includes a hardware based-device, and wherein the hardware-based device includes one of a button, a dial, a switch, and a wireless input device.

3. The data storage device of claim 1, wherein the non-volatile memory array includes a flash memory array, and wherein the host interface includes a Universal Serial Bus (USB) interface.

4. The data storage device of claim 3, wherein the data storage device complies with the U3 technical specification.

5. The data storage device of claim 1, wherein files or registry entries written to the host device are removed when the data storage device is ejected from the host device.

6. The data storage device of claim 1, wherein the first operation of the user input device includes one of physically manipulating the user input device and remotely transmitting a wireless signal to the user input device, and wherein the application configuration data includes a first human interface device (HID) descriptor that provides instructions to the host device to launch the configuration application.

7. The data storage device of claim 6, wherein the first HID descriptor includes an array of bytes describing data packets communicated from the data storage device to the host device.

8. The data storage device of claim 1, wherein the second operation of the user input device includes one of physically manipulating the user input device and remotely transmitting a wireless signal to the user input device, and wherein the application designation data includes a second HID descriptor that provides instructions to the host device to launch the selected application, and wherein the selected application includes one of a backup application, a slide-show application, a photo editor application, a word processor application, a presentation application, an audio player application, and a video player application.

9. The data storage device of claim 1, wherein the data storage device is detachable from the host device.

10. The data storage device of claim 1, wherein in response to the second operation of the user input device, the application designation data is communicated from the data storage device to the second host device via the host interface, and wherein the application designation data is configured to trigger automatic execution by a second host device of the selected application.

11. The data storage device of claim 1, wherein after the data storage device is connected to the host device via the host interface, the data storage device is disconnected from the host device in response to a command at the host device to disconnect the data storage device.

12. The data storage device of claim 1, further comprising a memory controller coupled to the host interface, and wherein the non-volatile memory array is coupled to the memory controller.

13. A data storage device, comprising:
a host interface adapted to connect the data storage device to a host device;
a non-volatile memory array dedicated for storage of content having a specific content type, wherein the non-volatile memory array contains application identification data corresponding to a predefined application, wherein the predefined application is associated with the specific content type; and
a first user input device;
wherein application identification data is communicated from the data storage device to the host device via the host interface in response to an operation of the first user input device, wherein the application identification data is configured to trigger execution by the host device of the predefined application by automatically locating and launching the predefined application using an operating system of the host device, and wherein the operation communicating the application identification data is initiated after the data storage device is connected to the host device via the host interface.

14. The data storage device of claim 13, wherein the non-volatile memory array stores data files formatted for processing by the predefined application.

15. The data storage device of claim 13, wherein the specific content type includes one of a text content type, an audio content type, and a video content type.

16. The data storage device of claim 13, wherein the first user input device is movable between a plurality of user selectable positions, wherein each of the plurality of user selectable positions is associated with one of a plurality of predefined applications.

17. The data storage device of claim 16, wherein first application identification data is communicated from the data storage device to the host device via the host interface in response to an operation of the first user input device at a first user selectable position, wherein the first application identification data is configured to trigger execution by the host device of a first predefined application.

18. The data storage device of claim 16, wherein second application identification data is communicated from the data storage device to the host device via the host interface in response to an operation of the first user input device at a second user selectable position, wherein the second application identification data is configured to trigger execution by the host device of a second predefined application.

19. The data storage device of claim 18, further comprising a first application indicator proximate to the first user selectable position and a second application indicator proximate to the second user selectable position, wherein the first application indicator describes the first predefined application and the second application indicator describes the second predefined application.

20. The data storage device of claim 19, wherein the first application indicator includes a first text description or a first visual image of the first predefined application, and the second application indicator includes a second text description or a second visual image identifying the second predefined application.

21. The data storage device of claim 13, further comprising a second user input device coupled to the host interface.

22. The data storage device of claim 21, further comprising:
a first application indicator, wherein the first application indicator describes a first predefined application associated with the first user input device; and
a second application indicator, wherein the second application indicator describes a second predefined application associated with the second user input device.

23. The data storage device of claim 13, wherein in response to operation of the first user input device, the data storage device is locked and the host device prompts a user for a password to unlock the data storage device.

24. A method, comprising:
detecting a first operation of a user input device at a data storage device;
communicating data from the data storage device to a host device via a host interface of the data storage device, wherein the data is configured to trigger execution by the host device of a configuration application;
detecting a second operation of the user input device identifying one of a plurality of applications as a selected application;
generating and storing application designation data corresponding to the selected application at a non-volatile memory array of the data storage device;
detecting a third operation of the user input device at the data storage device; and
communicating the application designation data from the data storage device to the host device via the host interface of the data storage device, wherein the application designation data is configured to trigger automatic execution by the host device of the selected application by locating and launching the selected application using an operating system of the host device, wherein the application designation data is communicated after the data storage device is connected to the host device via the host interface.

25. The method of claim 24, further comprising using a memory controller of the data storage device to initiate the communicating of the application designation data to the host device.

26. A data storage device, comprising:
a non-volatile memory;
a user input device; and
a host interface adapted to connect to a host device and to convey data to the host device, the data including application designation data and application configuration data, wherein the application configuration data is communicated to the host device in response to a first operation of the user input device and is configured to trigger execution by the host device of a configuration application, wherein the application designation data is generated and stored in the non-volatile memory in response to user input selecting an application, wherein execution of the configuration application causes an operating system of the host to automatically launch the selected application, and wherein the application designation data is communicated to the host device in response to a second operation of the user input device, wherein the configuration application includes a listing of a plurality of applications for display by the host device enabling designation of one of the plurality of applications as the selected application.

27. The data storage device of claim 26, wherein the non-volatile memory includes a flash memory, and wherein the host interface includes a Universal Serial Bus (USB) interface.

28. A data storage device, comprising:
a host interface adapted to connect the data storage device to a host device;
a non-volatile memory dedicated for storage of content having a specific content type, wherein the non-volatile memory contains application identification data corresponding to a predefined application, wherein the predefined application is associated with the specific content type; and
a first user input device;
wherein the application identification data is communicated from the data storage device to the host device via the host interface in response to an operation of the first user input device, wherein the application identification data is configured to trigger execution by the host device of the predefined application by causing an operating system of the host device to automatically launch the predefined application.

29. The data storage device of claim 28, wherein the non-volatile memory stores data files formatted for processing by the predefined application.

30. The data storage device of claim 28, wherein the specific content type includes one of a text content type, an audio content type, and a video content type.

31. A method, comprising:
in a data storage device including a host interface, a non-volatile memory, and a user input device, performing:
detecting a first operation of the user input device;
communicating data from the data storage device to a host device via the host interface, wherein the data is configured to trigger execution by the host device of a configuration application;
detecting a second operation of the user input device identifying one of a plurality of applications as a selected application;
generating and storing application designation data corresponding to the selected application at the non-volatile memory;
detecting a third operation of the user input device; and
communicating the application designation data from the data storage device to the host device via the host interface, wherein the application designation data is configured to trigger automatic execution by the host device of the selected application by causing an operating system of the host device to launch the selected application, wherein the application designation data is communicated after the data storage device is connected to the host device via the host interface.

32. The method of claim 31, further comprising using a memory controller of the data storage device to initiate the communicating of the application designation data to the host device.

* * * * *